Aug. 5, 1930.  H. M. HESSENBRUCH  1,772,139
TWISTING MACHINE
Original Filed Jan. 7, 1929   2 Sheets-Sheet 1
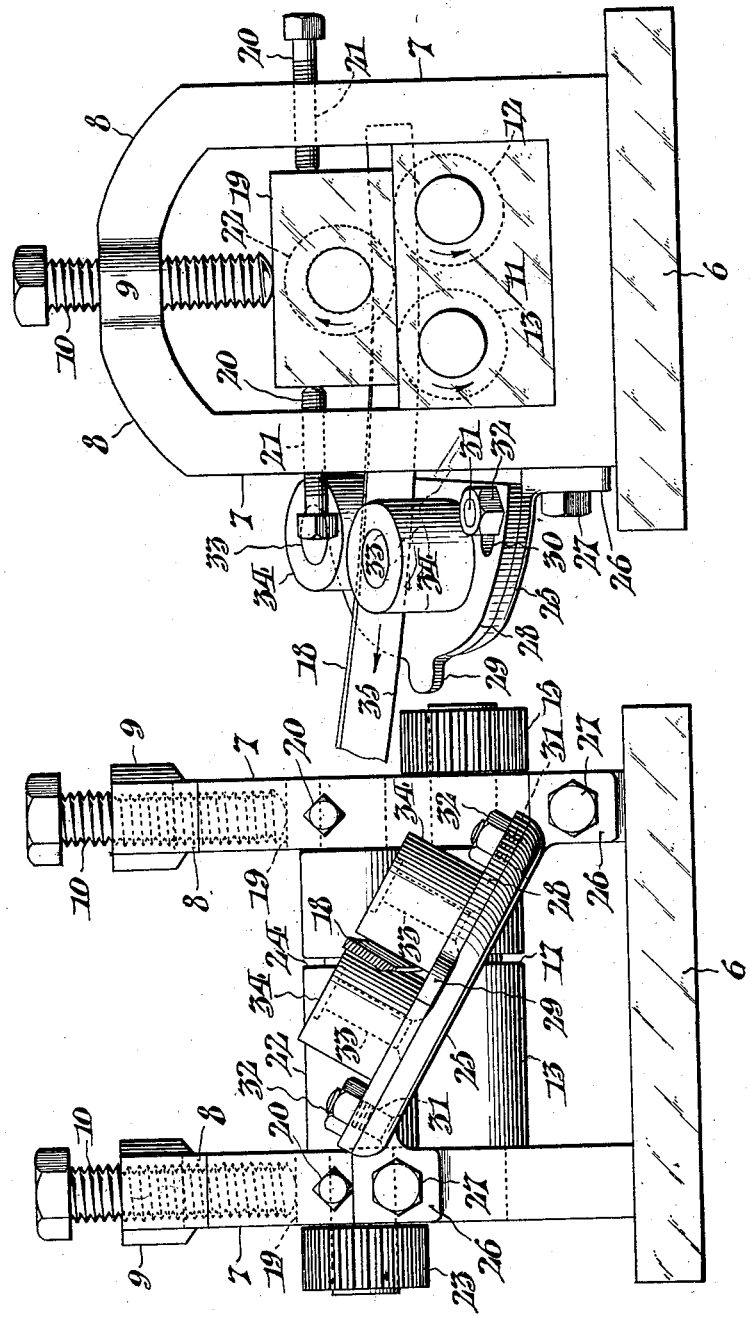
INVENTOR:
Hermann M. Hessenbruch,
BY Fraley Paul
ATTORNEYS.

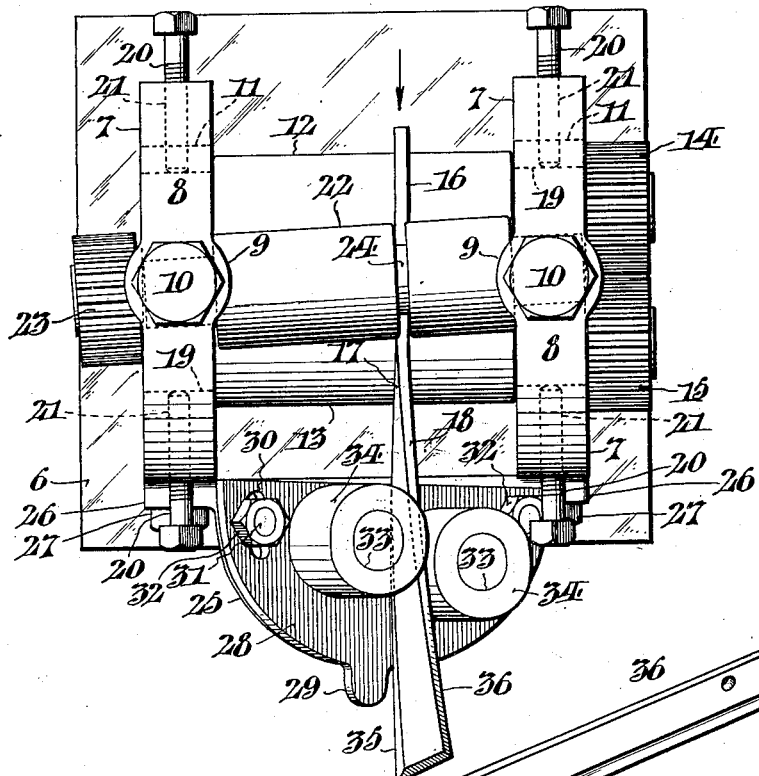
FIG. III.
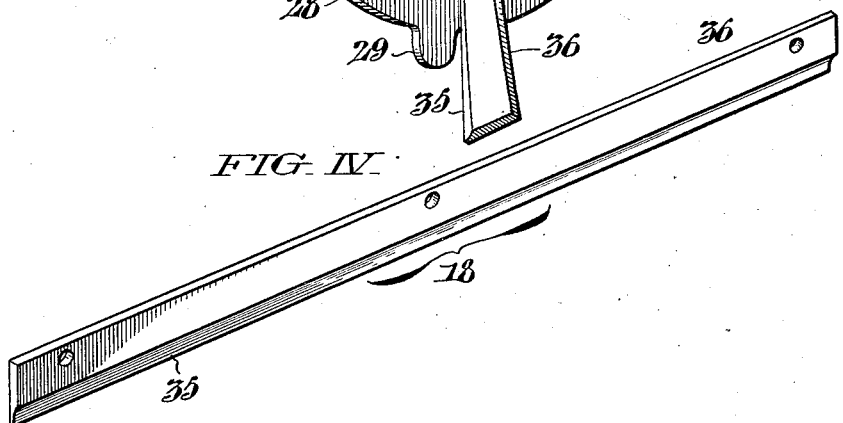
FIG. IV.
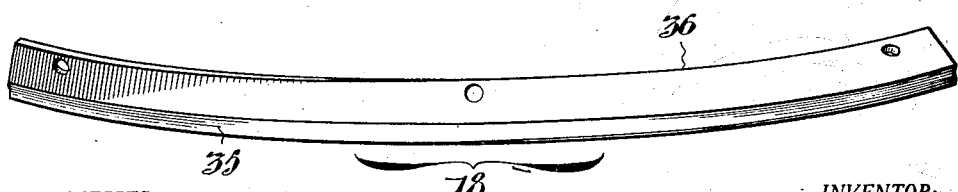
FIG. V.

Patented Aug. 5, 1930

1,772,139

UNITED STATES PATENT OFFICE

HERMANN M. HESSENBRUCH, OF WYNNEWOOD, PENNSYLVANIA, ASSIGNOR TO PHILADELPHIA LAWN MOWER COMPANY, INC., OF PHILADELPHIA, PENNSYLVANIA, A CORPORATION OF PENNSYLVANIA

TWISTING MACHINE

Application filed January 7, 1929, Serial No. 330,767. Renewed March 19, 1930.

This invention relates in its broader aspects to machines for twisting bar or strip material, and it has more particular reference to a type of machine adapted to the production of lawn mower cutting-reel blades.

Heretofore the fabrication of lawn mower cutting-reel blades has usually been effected by heating a suitable length of strip steel, placing it while hot in a suitable former for the purpose of producing the necessary bend, and then dropping it into a second form to effect the requisite twist. Owing to the unevenness of the "heat", consequent upon the time required in handling such blades, there has resulted much lack of uniformity, both in the bend and in the twist.

The primary object of my invention is to overcome the above noted disadvantage by provision of a machine wherein the bending and twisting operations are effected, in an absolutely uniform manner, irrespective of the temperature factor.

Another object is to provide a machine which is adapted to produce lawn mower cutting-reel blades from either cold or heated bar or strip steel.

A further object is the provision of a machine which is compact, of simple construction, and easily adjusted to varying requirements insofar as the article produced is concerned.

With the foregoing and other objects in view, this invention resides in the structure and component parts, all as more particularly set forth in the following specification.

The adaptation of the invention shown by the drawings is a preferred form, but it is to be understood that modifications in the construction and arrangement of the several parts may be resorted to without departing from the spirit thereof, as more specifically defined in the subjoined claims.

In the drawings:

Fig. I is a rear elevation of my novel bending and twisting machine;

Fig. II is a side view of the same, looking toward the left hand of the preceding illustration, with certain gears omitted to avoid confusion;

Fig. III is a top plan view;

Fig. IV is a perspective view of the blade blank prior to passage through the machine; and Fig. V is a similar view of the blade after bending and twisting.

Referring more in detail to Figs. I, II, and III, my novel machine comprises a substantial base 6 with upstanding walls or yoke housings 7, having arched tops 8, including centrally-located apertured enlargements 9, which are screw-threaded for reception of adjuster screws 10.

Suitably secured in the yoke housings 7 are appropriate bearing blocks 11, in which are rotatably journaled a feed roll 12 and a bending roll 13, both being adapted for rotation, by means of attached gears 14, 15, in the same direction—or counter-clockwise for example—through the medium of suitable means, not shown, but obvious to those conversant with the mechanical arts. The feed and bending rollers 12, 13, are journaled with their axes in the same horizontal plane. They are provided with grooves 16, 17 of a depth to accommodate approximately the lower half or width of the blade blank 18, as best appreciated from Fig. II.

Surmounting the bearing blocks 11 are upper bearing blocks 19 having capacity for lateral displacement relative thereto under control of adjuster screws 20 engaging in correspondingly-threaded holes 21 in the vertical side elements of the yoke housings 7. These upper blocks 19 afford journal bearing for a roll 22, having an attached gear 23 whereby it is suitably rotated in an opposed direction—or clockwise—relative to the rollers 11, 12, with which it cooperates. Said roll 22 is provided with a circumferential groove 24 in register over the grooves 16, 17, that serves to accommodate the upper half of the blade blank 18. The roll 22 is located medially over the rolls 12, 13, and is also shown (Fig. III) as extending at an angle to them. Thus it can cooperate with the rolls 12, 13 to bend the blade blank 18 edgewise and also to twist it.

Mounted to the rear of the machine is an inclinedly-disposed shelf or bracket 25 having apertured ears 26 whereby it is rigidly secured to the yoke housings 7, by means of stud bolts 27. Adjustably supported on the shelf or bracket 25 is a plate member 28, with a manipulator projection 29, having capacity for partial rotative adjustments through the medium of arcuate slots 30 co-operatively engaged over screw studs 31, rigidly fixed in said bracket; clamp nuts 32 being applied to said studs for firmly securing the plate member 28 at the requisite adjustment, in an obvious manner. Pivotally mounted on the plate member 28, by means of stud axes 33 fixedly secured at right angles therein, are a pair of freely rotative guide rolls 34. These cooperative rolls 34 lie in front of the combined groove-pass 16, 17, 24 of the rolls 12, 13, 22, and are shown at an oblique angle to this groove-pass, to engage laterally with opposite sides of the blank 18 as it leaves the rolls 13, 22. It is to be noted that these guide rolls 34 are spaced for easy passage therebetween of the blade blank 18 after it leaves the bending and twisting rollers 13, 22, whereby any recoil in said blade, incident to its production by my novel machine, is counteracted and permanent spiral "set" imparted thereto.

In operation the blade blank 18 is fed into the machine by entering it "edge-on," with the cutter portion 35 in the groove 16 of the feed roller 12, and forcing the back portion 36 into the groove 24 of the roller 22. The rotation of the rollers 12, 13 and 22 is in the direction of the arrows shown on Fig. II. It will be readily apparent that as the blade blank 18 progresses through the machine, it will be given a definite uniform longitudinal curvature, by virtue of the vertical spacial relation of the rollers 12, 13 and the downward thrust intermediately therebetween of the twisting or upper roller 22, under control of the adjuster screws 10. At the same time, due to the angular placement of the twisting roller 22, the groove 24 therein will impart a spiral twist to the blade blank 18; which twist is prevented from recoil, and permanently "set" at a definite angle, by the further progress of said blank through the supplemental relatively inclined guide rolls 34. Thus the blank 18 can be both curved edgewise and twisted spirally at a single pass through the machine.

Incidentally, it is emphasized that vertical adjustment of the bearing blocks 19 by insertion of appropriate "shims" therebelow, for example, under control of the adjuster screws 10, (and the consequent adjustment of the roll 22 laterally relative to the rolls 12, 13) determines the longitudinal curvature of the blade blank 18; whereas lateral adjustment of said blocks—or varied angular dispositions thereof—which carry the roller 22 with them relative to the axes of the rollers 12, 13, governs the required spiral or angular twist given the finished product.

Finally, while I have particularly described a convenient or preferred embodiment of the invention, it is to be understood that modifications in its constructive aspects, as well as other adaptations, may be resorted to without departing from the spirit of said invention, as more specifically defined by the following claims.

Having thus described my invention what I claim is:—

1. The combination in a twisting machine of co-operative grooved rollers in angular relation and adapted to engage opposite edges of the material to be twisted, and means whereby said rollers can be relatively adjusted to vary the degree of twist imparted.

2. The combination in a twisting machine of co-operative grooved rollers in angular relation and adapted to engage opposite edges of the material to be twisted, means whereby said grooved rollers can be relatively adjusted to vary the degree of twist imparted, and means serving to permanently set such twist.

3. The combination in a twisting machine of co-operative grooved rollers in angular relation and adapted to engage opposite edges of the material operated upon, thereby to twist and concurrently curve the same longitudinally, and means whereby one of the grooved rollers can be positionally adjusted to alter the degree of twist and curvature imparted.

4. The combination in a twisting machine of co-operative grooved members in angular relation and adapted to engage opposite edges of the material operated upon, thereby to twist and concurrently curve the same longitudinally, adjusting means whereby one of the grooved members can be positionally shifted relative to the others to alter the degree of twist and curvature imparted, and means serving to permanently set the twist.

5. The combination in a twisting machine of co-operative grooved members in angular relation and adapted to engage opposite edges of the material operated upon, thereby to twist and concurrently curve the same longitudinally, adjusting means whereby one of the grooved members can be positionally shifted relative to the others to alter the degree of twist and curvature imparted, means serving to permanently set the twist, and adjustments whereby said latter means may be rotatively shifted to accommodate the twist variations.

6. The combination in a twisting machine of co-operative grooved rollers with axes in angular relation and adapted to engage opposite edges of strip material, thereby to twist and concurrently curve the same longitudinally, and means whereby the rollers can be adjusted relatively to vary the twist and curvature imparted.

7. The combination in a twisting machine of co-operative grooved rollers with axes in angular relation and adapted to engage opposite edges of strip material, thereby to twist and concurrently curve the same longitudinally, adjusting means whereby the rollers can be relatively shifted to vary the twist and curvature imparted, and supplemental obliquely mounted guide rolls serving to permanently set the twist.

8. The combination in a twisting machine of parallel grooved rollers and a superjacent similar roller with its axis in angular relation thereto, said grooved rollers being adapted to engage opposite edges of bar material thereby to twist and concurrently curve the same longitudinally, and means whereby the superjacent roller can be adjusted relatively to vary the twist and curvature imparted.

9. The combination in a twisting machine of parallel grooved rollers and a superjacent similar roller with its axis in angular relation thereto, said grooved rollers being adapted to engage opposite edges of bar material thereby to twist and concurrently curve the same longitudinally, adjusting means whereby the superjacent roller can be relatively shifted to vary the twist and curvature imparted, and guide means having capacity to permanently set the twist, said guide means being adjustable to accommodate different degrees of twist impressed on the bar material.

10. The combination in a twisting machine of a group of co-operating grooved rollers with axes in angular relation and adapted to engage opposite edges of blank bar material thereby to twist and concurrently curve the same longitudinally in a single pass between them, and means whereby said rollers can be adjusted relatively to alter the twist and curvature imparted to the bars.

11. The combination in a twisting machine of a group of co-operating grooved rollers with axes in angular relation and adapted to engage opposite edges of blank bar material thereby to twist and concurrently curve the same longitudinally in a single pass between them, and separate means for adjusting the angularity of said rollers and their spacing to alter the twist and curvature imparted to the bars.

12. The combination in a twisting machine of a group of co-operating rollers with axes in angular relation and adapted to engage opposite edges of blank bar material thereby to twist and concurrently curve the same longitudinally in a single pass between them, separate means for adjusting the angularity of the rollers and their spacing to vary the twist and curvature imparted to the bars, and auxiliary obliquely-disposed rollers having capacity for partial rotary adjustment adapted to set the twist given said bars.

13. The combination in a twisting machine of parallel grooved rollers adapted to engage one half of flat bar material, a superjacent angularly-disposed roller with a corresponding groove over the grooves of the parallel rollers and engaging the other half of the bar material, said angularly arranged roller serving to twist and concurrently curve the material longitudinally, means whereby the angularity of the superjacent roller and its spacing relative to the parallel rollers may be adjusted to vary the twist and curvature imparted, and obliquely disposed freely rotatable rolls receiving the material as it leaves the aforesaid rollers to impart permanent set thereto.

14. The combination in a twisting machine of parallel grooved rollers adapted to engage one half of flat bar material, a superjacent angularly-disposed roller with a corresponding groove over the grooves of the parallel rollers and engaging the other half of the bar material, said angularly arranged roller serving to twist and concurrently curve the material longitudinally, adjuster screws whereby the superjacent roller may be angularly shifted and spaced relative to the parallel rollers to vary the twist and curvature imparted, and supplemental obliquely-disposed freely-revolvable guide rolls serving to set the twist.

15. The combination in a twisting machine of parallel grooved rollers adapted to engage one half of flat bar material, a superjacent angularly-disposed roller with a corresponding groove over the grooves of the parallel rollers and engaging the other half of the bar material, said angularly arranged roller serving to twist and concurrently curve the material longitudinally, adjuster screws whereby the superjacent roller may be angularly shifted and spaced relative to the parallel rollers to vary the twist and curvature imparted, supplemental obliquely-disposed freely-revolvable guide rolls serving to set the twist, said guide rolls being carried by a partially rotatable member thereby to accommodate differing twists, and means for securing said member at the requisite adjustment.

16. The combination, in a twisting machine, of cooperative grooved rolls adapted to engage in their grooves the opposite edges of the material to be twisted, and co-operative rolls in close proximity to said grooved rolls adapted to engage laterally with opposite sides of the material, at an angle to the combined groove-pass of the said grooved rolls, and thus coacting directly with the grooved rolls in imparting permanent twist to the material.

17. The combination, in a machine of the character described, of rolls with grooves for engaging one edge of the material to be operated on, and a cooperating roll grooved for intermediately engaging its opposite edge, with means for adjusting the relative position and angular relation of the latter roll and the first-mentioned rolls.

18. A twisting machine of the character described comprising rolls with grooves for engaging one edge of the material to be operated on and a cooperating roll grooved for intermediately engaging its opposite edge, and cooperative rolls adapted to engage laterally with opposite sides of the material, at an angle to the combined groove-pass of the aforementioned grooved rolls.

19. The combination, in a machine of the character described, of rolls with grooves for engaging one edge of the material to be operated on; a cooperating roll grooved for intermediately engaging its opposite edge, and adjustable laterally and angularly relative to the first-mentioned rolls; and cooperative rolls adapted to engage laterally with opposite sides of the material, and adjustable relative to the groove-pass of the aforementioned grooved rolls.

In testimony whereof, I have hereunto signed my name at Philadelphia, Pennsylvania, this 19th day of December, 1928.

HERMANN M. HESSENBRUCH.